United States Patent Office 3,320,188
Patented May 16, 1967

3,320,188
PROCESS FOR PREPARING MULTICELLULAR BODIES
Louis Dijkema, The Hague, Netherlands, assignor to Stamicarbon N.V., Heerlen, Netherlands
No Drawing. Filed Dec. 3, 1962, Ser. No. 241,497
Claims priority, application Netherlands, Dec. 5, 1961, 272,191
25 Claims. (Cl. 260—2.5)

The present inventon relates to a process for preparing muticellular bodies starting from a thermoplastic material containing a cell-forming substance and an auxiliary material in a finely divided state.

A process of this type is known for the British patent specification 837,723, in which a description is given of the preparation of multicellular bodies by expansion of molten polymers or copolymers of alkenes, such as polyethylene, with 1,2-dichlorotetrafluoroethane as a cell-forming substance. In this process the auxiliary material used is a finely divided solid material, such as calcium silicate, zinc stearate, or magnesium stearate. The addition of this finely divided solid auxiliary materials makes it easier, according to this patent specification, to obtain a multicellular body the cells of which are small.

It has appeared to the applicant that it is possible to prepare multicellular bodies, the cells of which are more uniform in size and, moreover, considerably smaller on an average than those of the bodies obtained by the known process. In addition, it was found that finely divided solid materials, such as calcium silicate, sometimes give rise to clogging, extra wear, and corrosion of the apparatus used.

The invention aims at providing a process which makes it possible to prepare from thermoplastic materials multicellular bodies containing very fine uniform cells. A special aim of the invention is a process which makes it easy to prepare multicellular bodies from macromolecular polyalkenes on a large scale without the attendance of clogging, extra wear or corrosion of the apparatus used.

The process according to the invention for preparing multicellular bodies starting from a thermoplastic material containing a cell-forming substance and an auxiliary material in a finely divided state, is characterized in that the auxiliary material is an organic substance which solidifies at a higher temperature than does the thermoplastic material.

Thermoplastic materials are, for instance, polycaprolactam and other polyamides, polyacrylonitrile, polymethyl acrylate, polymethyl methacrylate, terpolymers of acrylonitrile, butadiene and styrene, polyester resins, polyvinyl chloride, polyformaldehyde, cellulose acetate, cellulose acetobutyrate, polystyrene or other crystalline or amorphous homopolymers or copolymers of mono-olefins or diolefins. Very good results are obtained with high-pressure polyethylene, low-pressure polyethylene, polypropylene, copolymers containing at least 80 mol.-percent of ethylene or propylene, or polystyrene.

The thermoplastic material is heated until a melt, i.e. a plastic, flowable mass, has formed. This melt should also contain a cell-forming substance and an auxiliary material in a finely divided state. However, grains containing the cell-forming substance and the auxiliary material may also be made to expand by heating in a mould.

By "cell-forming substance" is here to be understood a substance which is or becomes gaseous during the expansion, e.g. a flowing agent. These substances normally have an atmospheric boiling point which is considerably lower, e.g. at least 40° C., than the expansion temperature. As a rule use is made of substances that are gaeous at room temperature, such as nitrogen, carbon dioxide, methyl chloride, 1,2-dichlorotetrafluoroethane, and the like. The cell-forming substance can be contained in the melt as the result of the previous addition to the thermoplastic material of a so-called chemical blowing agent, such as dinitrosopentamethylenetetramine, ammonium carbonate, or azodicarbonamide, from which the cell-forming substance has been produced by heating. However, the cell-forming substance may also have been added as such to the thermoplastic material before, during, or after heating. In this case the cell-forming substance is referred to as a physical blowing agent.

Physical blowing agents that are commonly used are nitrogen, carbon dioxide, lower-boiling aliphatic hydrocarbons, such as methane, butane, pentane, hexane, or benzene, fully or partially halogenated alkane derivatives, in particular those containing both chlorine and fluorine, such as $CCl_3F$, $CCl_2F_2$, 1,2-dichlorotetrafluoroethane, or 1-chloro-1,2,2-trifluorethane, methanol, acetone, low-boiling esters, such as methyl formiate and methyl acetate.

In the process according to the invention use is preferably made of a mixture of an aliphatic hydrocarbon and a fully halogenated alkane derivative containing both chlorine and fluorine, in particular a mixture containing 50–90% by weight of n-pentane.

The auxiliary material used according to the invention is an organic substance, which here stands for a metal-free compound containing carbon. Before the expansion this organic substance should be contained in the melt, or in the grain to be expanded by heating, in a finely-divided, i.e. dissolved, emulsified, or suspended, state. This can be easily effected e.g. by mixing the auxiliary material with the thermoplastic material at a temperature higher than the solidification point of the auxiliary material. Is so desired, this mixing may be carried out before or during the polymerization in a separate process. It is not necessary that the auxiliary material should be in a finely divided state before mixing, if not the grain, but the melt is made to expand.

In addition, the organic auxiliary material should have a solidification point that is higher—preferably at least 10° C.—than the temperature at which solidification of the melt of the thermoplastic material sets in. Furthermore, considerably less favourable results are obtained if the solidification point of the auxiliary material exceeds that of the thermoplastic material by more than 100° C. The difference between the solidification points is preferably 20–75° C. If the organic substance has no definite point of solidification, but a range of solidificaton, the highest temperature of this range must exceed the highest temperature of the solidification range of the thermoplastic material.

Consequently, solidification here denotes the transition from flowable melt to solid state. This solid state may be both crystalline and amorphous.

The auxiliary material used by preference is a wax, in particular a fully or partially microcrystalline wax, e.g. the commercial "Hoechst-Wachs E," which belongs to the so-called "ester waxes." Use may also be made, for instance, of the commercial waxes "Hoechst-Wachs C," "Abril 10 DS," "Abril PDS," or "Acrawax C."

If a melt is expanded in an extruder, it normally has a high pressure, e.g. 10, 50, 100 atom. or more before the expansion. During the expansion gas bubbles form or existing gas bubbles strongly expand, while the thermoplastic material cools down to about or below the solidification point and a multicellular body is formed. It is remarkable that the cells of this body should be considerably finer (average diameter of cells: 0.1–0.2 mm., sometimes 0.05 mm.) and more uniform than those of a body obtained with the use of a known auxiliary material, such as silicon oxide or calcium stearate.

The formation of the fine and uniform cells in this process is difficult to explain at present. It is probably bound up with the formation of a finely divided solid phase of the auxiliary material during cooling of the melt before or during the expansion. At any rate, a multicellular body of good quality is obtained in a more reliable way if the melt is already cooled before the expansion. Consequently, the melt is preferably first heated to a temperature above the solidification point of the auxiliary material and subsequently, before the expansion, cooled to a temperature intermediate between the solidification point of the auxiliary material and that of the thermoplastic material.

The amount of organic auxiliary material supplied may be varied within wide limits. In most cases this amount will exceed 0.1% by weight with respect to the thermoplastic material and, for reasons of economy, will not exceed 10% by weight. By preference 0.5–5% by weight is used.

The thermoplastic material may also contain dye-stuffs, filling materials, plasticizers, stabilizers, anti-oxidants, anti-corrosion agents, free-radical sources, and the like. These additions may also contain metal atoms. The auxiliary material, at least the greater part of it, should consist of molecules which do not contain metal atoms.

The process according to the invention can be carried out in a continuous manner by making a melt expand continuously through an outlet-opening of a desired profile, e.g. a round or slot-shaped opening, if so desired around a metal core. However, the process can also be realized discontinuously by periodically filling a mould with the expanding melt or alternately filling one mould and emptying another.

What can be made by the process according to the invention is: articles, films, fibers, electric cables, etc.

If so desired, the thermoplastic material can be radiated immediately before, during, or after the expansion, which causes crosslinking.

The invention will be elucidated by the following examples.

*Example 1*

Use was made of a commercial "Troester UP 30," extruder fitted with a round orifice of 1.2 mm. in diameter. The screw was provided over part of its length, with a central bore communicating, approximately in the middle of the screw, with the space between screw and cylinder, and, at the end of the screw farthest from the orifice, being connected to a metering pump for the blowing agent. 5 screening plates with a mesh width of 0.14 mm. were placed between the orifice and the screw. The jacket of the cylinder incorporates the temperature measuring points $T_1$, $T_2$, $T_3$, $T_4$ and $T_5$, as seen in the direction from the supply funnel for the thermoplastic material to the orifice. Near the orifice the cylinder jacket is provided with a cooling cylinder, which enables the temperatures at $T_4$ and $T_5$ to be lowered at will. The thermoplastic material enters the atmosphere through the orifice.

Grains of a mixture of high-pressure polyethylene (melt index 1.9 and 2% by weight of the crystalline wax mentioned in Table 1 are fed into the supply funnel of the extruder. In Experiment 1 no wax was added. At first the machine was so operated that the temperatures at $T_1$ to $T_5$ were 150, 170, 170, 170, 170° C., respectively, a mixture of 80% by weight of pentane and 20% by weight of $CCl_3F$ being supplied as the cell-forming substance. Amounts of cell-forming substance and of polyethylene were blown out in turn through the orifice.

The temperatures at $T_4$ and $T_5$ were lowered, so that foam formed in some cases at a given temperature, which normally ranged between 130 and 150° C. at $T_4$ and between 100 and 115° C. at $T_5$. The results are given in Table 1.

Only an irregular foam formation was obtained in the Experiments 1, 2 and 3 mentioned in Table 1, in which a product consisting almost exclusively of very large bubbles and bearing a slight resemblance to a rope of pearls, randomly alternated with a foam of poor quality (strongly varying size of the cells).

| No. | Microcrystalline wax | | Product | | | |
|---|---|---|---|---|---|---|
| | Trademark | Melting point, °C. | Uninterrupted foam formation? | Yield (g./min.) | Density (g./cm.³) | Quality |
| 1 | | | No | | | |
| 2 | Hoechst E | About 75 | No | | | |
| 3 | Hoechst OP | About 95 | No | | | |
| 4 | Hoechst C | About 140 | Yes | 12.5 | 0.049 | Very goo |
| 5 | Abril 10 DS | About 140 | Yes | 13.5 | 0.068 | Good. |
| 6 | Abril PDS | About 170 | Yes | 13 | 0.038 | Very good. |

The additive used in the Experiments 4, 5 and 6 mentioned in Table 1 had a higher melting point than the high-pressure polyethylene used. As a result the auxiliary material solidifies at a higher temperature than the thermoplastic material.

The thread of foam obtained in the Experiments 4, 5 and 6 had a diameter of approximately 5 mm., the cells being particularly uniform and fine (average diameter approximately 0.09 mm.).

However, if zinc stearate or vermiculite was used as the auxiliary material, a foam was obtained the cells of which were much coarser and less uniform. In addition, serious corrosion of the screw and plugging of the screens occurred in the latter case.

If only 1% by weight of the commercial Hoechst C microcrystalline wax was used, a good foam having a density of 0.05 was obtained at $T_5 = 105°$ C. When $T_5$ fell to 103° C., larger bubbles formed under the surface of the thread of foam. If still smaller amounts of auxiliary material should be used, the temperature range in which good products can be prepared becomes still smaller. By preference, used in made of 0.5–5% auxiliary material.

If Experiment 4 is repeated exclusively with pentane, or exclusively with $CCl_3F$, as the blowing agent, a product with a slightly less good appearance is obtained in both cases. Use is preferably made of a mixture 50–90% by weight of which consists of an aliphatic hydrocarbon and 50–10% by weight of which consists of a fully halogenated alkane derivative containing both chlorine and fluorine.

*Example 2*

The Experiments 1, 4 and 6 described in Example 1 were repeated, with this difference that polyethylene prepared with chromium oxide at low-pressure and having a melt index of 1.5 was used instead of high-pressure polyethylene, and $T_1$, $T_2$ and $T_3$ were adjusted to 170, 190, 190° C.

In this case, and in the experiment without auxiliary material, no uninterrupted foam was obtained when use was made of the commercial "Hoechst C" wax, which has about the same solidification point as the low-pressure polyethylene used, whereas, at a $T_5$ temperature of 153° C., the other mixture gave a good foam having a density of 0.064 and being composed of cells with an average diameter of 0.02 mm.

If a melt of the latter mixture is cooled down in a separate experiment, the formation of long crystals is already observed at 167° C.

*Example 3*

The Experiments 1 and 6 described in Example 1 were repeated, with this difference that a Ziegler polyethylene with a melt index of 1.5 was used instead of a high-pressure polyethylene and $T_1$, $T_2$ and $T_3$ were adjusted to 150, 170, 170° C.

In the experiment without auxiliary material no uninterrupted foam was obtained, whereas in the experiment with the commercial "Abril PDS" wax a good foam with a density of 0.058 formed at $T_4$ and $T_5$ temperatures of 132 and 126° C., respectively.

Naturally, the process described in the examples may be deviated from in various ways. Thus, the organic auxiliary material can very well be fed to the melt of thermoplastic material together with the cell-forming substance.

*Example 4*

The Experiments 1 and 5, described in Example 1 were repeated, with this difference that polystyrene was used instead of high-pressure polyethylene.

In the experiments without auxiliary material no uninterrupted foam was obtained, whereas a good foam formed in the experiment with the wax.

*Example 5*

A 1 mm. thick plate was compression-moulded from a mixture of 98% of polystyrene and 2% of the commercial wax Abril PDS (moulding temperature: 150° C., preheating time: 2 minutes, moulding time: 3 minutes), and subsequently immersed in n-hexane until about 6% of hexane had been taken up. This plate and a similar plate containing no wax were then treated in boiling water. The foam from the former plate was considerably less irregular than the foam forming from the latter plate.

I claim:

1. A process for preparing multicellular synthetic thermoplastic bodies comprising forming a melt of a synthetic thermoplastic polymer cnotaining a blowing agent and a wax, in a finely divided state, having a higher solidification point than the thermoplastic polymer; and introducing the melt into a zone of lower pressure to solidify and expand said polymer and form a multicellular body.

2. Process according to claim 1, in which said wax is at least partially micro-crystalline.

3. Process according to claim 1 in which the solidification point of said wax is 10–100° C. higher than that of said thermoplastic polymer.

4. Process according to claim 3 in which the difference between said solidification points is 20–75° C.

5. Process according to claim 1 in which the amount of wax is 0.5–5% by weight with respect to said thermoplastic polymer.

6. Process according to claim 1 in which said melt is first heated to a temperature above the solidification point of the organic substance and, subsequently, before the expansion, cooled to a temperature between the solidification point of the wax and that of the synthetic thermoplastic polymer.

7. Process according to claim 1 in which said blowing agent consists essentially of a halogenated alkane derivative containing both chlorine and fluorine.

8. Process according to claim 1 in which said blowing agent consists essentially of a mixture of an aliphatic hydrocarbon and a halogenated alkane derivative containing both chlorine and fluorine.

9. Process according to claim 8 in which said aliphatic hydrocarbon comprises 50–90% by weight of said mixture.

10. Process according to claim 1 in which said thermoplastic polymer consists essentially of high pressure polyethylene.

11. Process according to claim 1 in which the thermoplastic polymer consists essentially of low pressure polyethylene.

12. Process according to claim 1 in which the thermoplastic polymer consists essentially of polypropylene.

13. Process according to claim 1 in which the thermoplastic polymer consists essentially of polystyrene.

14. A process for preparing multicellular thermoplastic bodies comprising forming a melt of a thermoplastic polymer selected from the group consisting of high-pressure polyethylene, low-pressure polyethylene, polypropylene, peolystyrene and copolymers of ethylene and propylene containing at least 80 mol. percent of one of these polymers, which melt contains a gaseous or volatile liquid blowing agent and 0.1–10% by weight with respect to the thermoplastic polymer of a wax, in a finely divided state, which is at least partially microcrystalline and has a higher solidification point than the thermoplastic polymer; and introducing the melt into a zone of lower pressure to solidify and expand said polymer and form a multicellular body.

15. A process for preparing multicellular synthetic thermoplastic bodies comprising forming a solid synthetic thermoplastic polymer containing a blowing agent and a wax, in a finely divided state, having a higher solidification point than the thermoplastic polymer; heating said polymer to a temperature above the solidification point of the thermoplastic polymer to effect expansion thereof; and cooling whereby a multicellular body is formed.

16. Process according to claim 15 in which the thermoplastic polymer consists essentially of polystyrene.

17. A composition capable of being formed comprising a synthetic thermoplastic polymer containing a blowing agent and 0.1–10% by weight with respect to the thermoplastic polymer of a wax, in a finely divided state, having a higher solidification point than the synthetic thermoplastic polymer.

18. A composition according to claim 17 in which the thermoplastic polymer is a member of the group consisting of high pressure polyethylene, low pressure polyethylene, polypropylene, polystyrene and copolymers of ethylene and propylene containing at least 80 mol. percent of one of these monomers.

19. Multicellular material prepared by the process of claim 1.

20. Multicellular material prepared by the process of claim 15.

21. Multicellular polyethylene in accordance with claim 19 having an average cell diameter of 0.05–0.2 mm.

22. Multicellular polypropylene in accordance with claim 19 having an average cell diameter of 0.05–0.2 mm.

23. A multicellular copolymer of ethylene containing at least 80 mol. percent of ethylene in accordance with claim 19 and having an average cell diameter of 0.05–0.2 mm.

24. A multicellular copolymer of propylene containing at least 80 mol. percent of propylene in accordance with claim 19 and having an average cell diameter of 0.05–0.2 mm.

25. Shaped products comprising multicellular bodies prepared according to the process of claim 1.

References Cited by the Examiner
UNITED STATES PATENTS

| | | | |
|---|---|---|---|
| 2,681,323 | 6/1954 | Groff et al. | 260—28.5 |
| 2,727,879 | 12/1955 | Vincent | 260—28.5 |
| 2,825,709 | 3/1958 | Sturm | 260—28.5 |
| 2,941,964 | 6/1960 | Houston et al. | 260—28.5 |
| 2,945,827 | 7/1960 | Henning | 260—2.5 |
| 3,026,272 | 3/1962 | Rubens et al. | 260—2.5 |
| 3,060,138 | 10/1962 | Wright | 260—28.5 |
| 3,067,147 | 12/1962 | Rubens et al. | 260—28.5 |
| 3,072,584 | 1/1963 | Krpovich | 260—2.5 |
| 3,224,984 | 12/1965 | Roper et al. | 260—2.5 |

MURRAY TILLMAN, *Primary Examiner.*

JAMES A. SEIDLECK, *Examiner.*

M. F. OELAK, *Assistant Examiner.*